March 11, 1924.
L. T. GODFREY-EVANS
1,486,427
INTERNAL COMBUSTION ENGINE
Filed Feb. 9, 1921 3 Sheets-Sheet 2
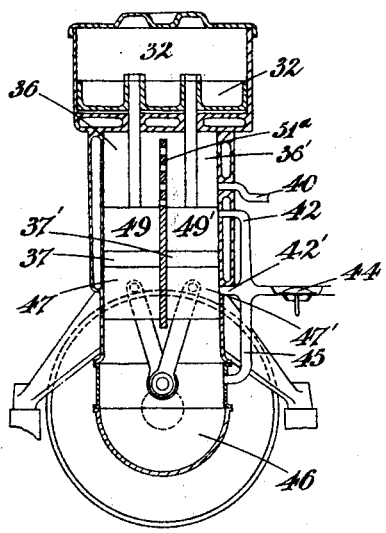
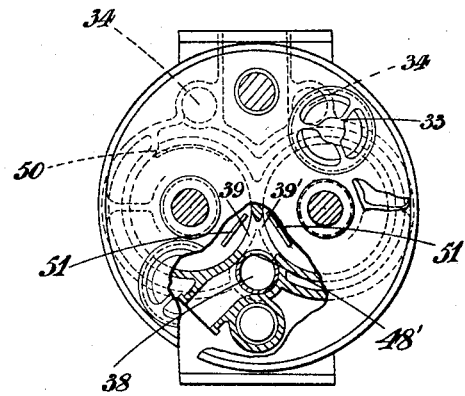
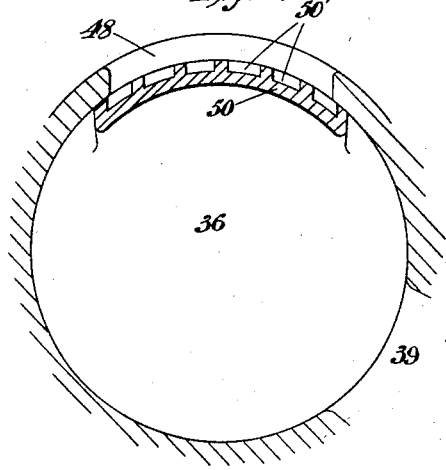
INVENTOR
L. T. GODFREY-EVANS
By
Atty.

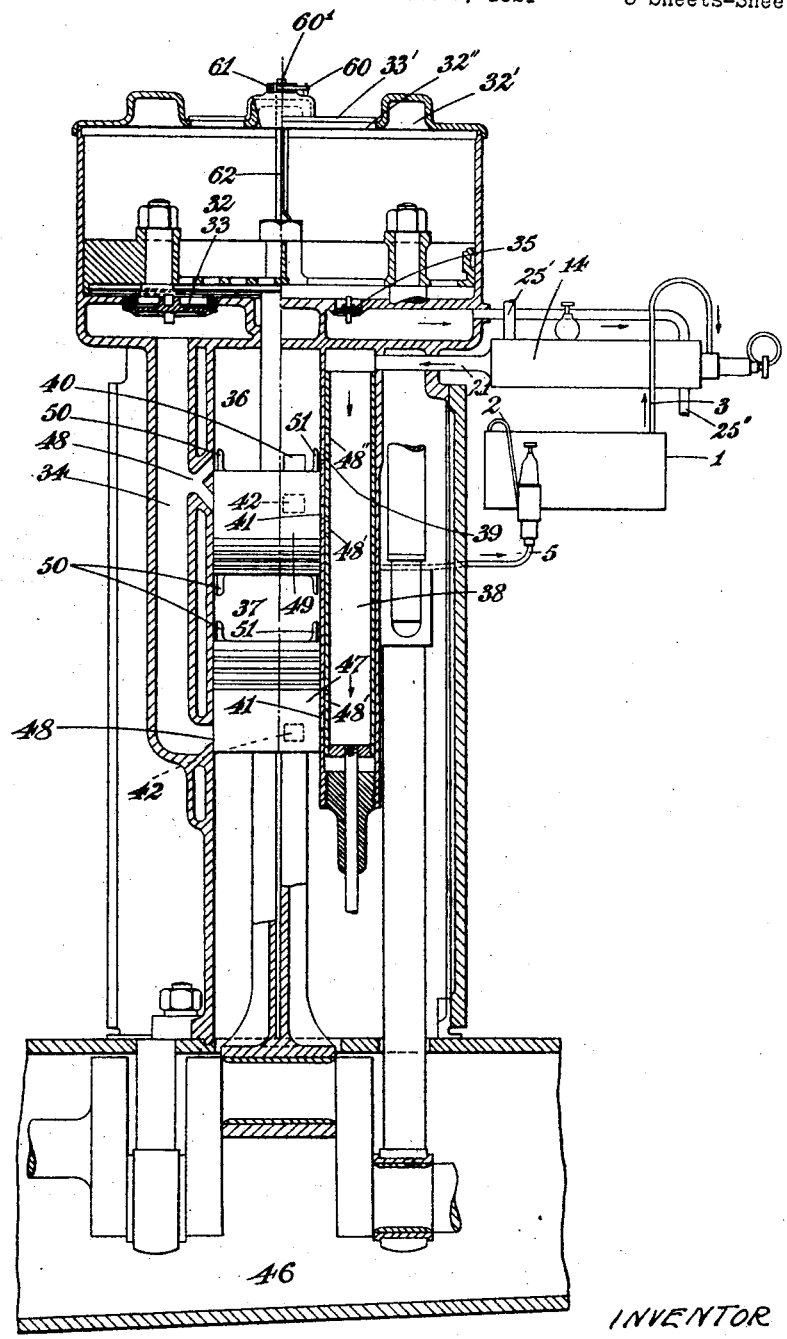

March 11, 1924.

L. T. GODFREY-EVANS

INTERNAL COMBUSTION ENGINE

Filed Feb. 9, 1921   3 Sheets-Sheet 3

INVENTOR
L. T. GODFREY-EVANS

Patented Mar. 11, 1924.

1,486,427

UNITED STATES PATENT OFFICE.

LEWIS THOMAS GODFREY-EVANS, OF WEST NORWOOD, LONDON, ENGLAND.

INTERNAL-COMBUSTION ENGINE.

Application filed February 9, 1921. Serial No. 443,644.

(GRANTED UNDER THE PROVISIONS OF THE ACT OF MARCH 3, 1921, 41 STAT. L., 1313.)

*To all whom it may concern:*

Be it known that I, LEWIS THOMAS GODFREY-EVANS, a subject of the King of Great Britain and Ireland, and a resident of West Norwood, county of London, England, have invented a certain new and useful Improvement in Internal-Combustion Engines (for which I have obtained Letters Patent in Great Britain No. 29376, dated November 28, 1919), of which the following is a specification.

This invention relates to improvements in two-stroke cycle internal combustion engines of the type having one, two or more cylinders each fitted with two oppositely moving working pistons, and operated by the method of injecting into the explosion chambers at about the end of the explosion stroke, a blast of air to scavenge the chambers and to replace the exhaust gases, then admitting a fuel to mix with the air in the explosion chamber in order to form an explosive mixture, and then compressing and firing this mixture in the usual way.

In practice, this method is applied to engines of the class wherein a piston in each cylinder serves for two working chambers these chambers being placed between the oppositely moving pistons and above the upper pistons and these chambers are supplied alternately with the blast of air and fuel whereby explosion occurs in one chamber while compression occurs in the other. Fuel is admitted under pressure to ports in the working chambers by means of an improved tubular timing valve, these ports being overrun by the pistons. The exhaust gases may pass from between the pistons to the crank case, whereby the remnant explosive force of the exhaust serves to aid compression by lifting the lower pistons. The exhaust gases may then be discharged through suitably timed valves.

The present invention provides an engine of improved construction operated by the scavenging method hereinbefore referred to, and comprising the arrangement of an air pump above the cylinders, fitted with inlet valves, distributing valves and passages, for forcing air under pressure into the explosion chambers through downtakes, to scavenge the said chambers when the ports in the downtakes are uncovered by the pistons, and to mingle with the rich mixture from the carburetter when the ports in the cylinder are opened by the movements of the pistons synchronizing with those of a tubular timing valve. The pump also supplies air under pressure to the carburetter to form the rich mixture. Grooved deflectors and baffles are also provided on the pistons to assist the scavenging process and to diffuse the incoming rich mixture into the captive air in the explosion chambers.

A preferred embodiment of the invention as applied to an engine of the class referred to is shown in the accompanying drawings, wherein:—

Figure 1 is a sectional elevation of the engine.

Figure 2 is a cross-sectional elevation of the engine to a smaller scale than Figure 1, and showing the means for utilizing the expansive force of the exhaust gases.

Figure 3 is a plan view, showing the arrangement of inlet valve for rich mixture, baffles and deflector plate.

Figure 4 is an enlarged plan showing grooves in the deflector plate.

Figure 5:
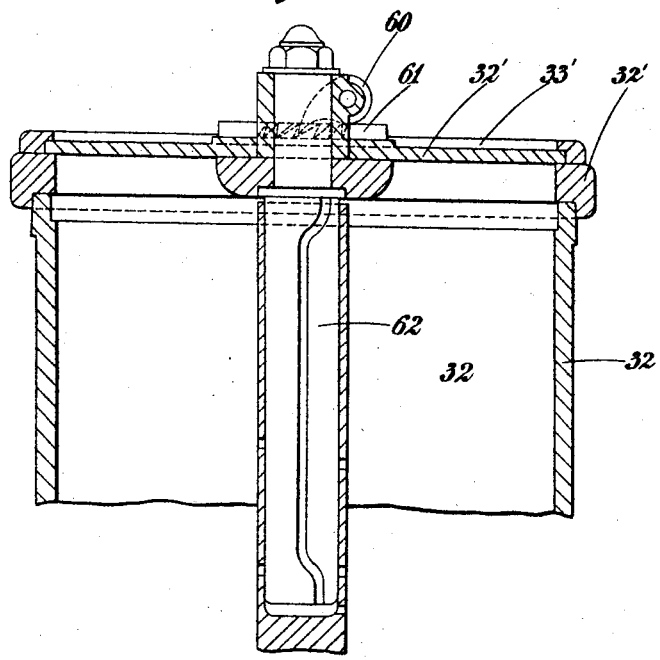
Figure 5 is an enlarged sectional elevation showing the construction of the pump cylinder and the arrangement of the air inlets.
Figure 6:
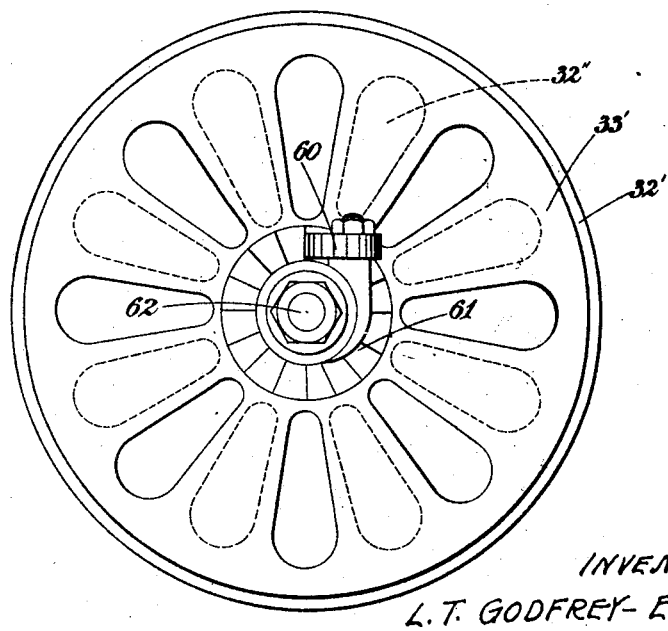
Figure 6 is a plan of Figure 5.

Referring to the said drawings, 1 is a fuel tank, 2, an inlet thereto for admitting combustion gases above the liquid level and connected through a spring pressed or equivalently loaded valve $2^a$ to the pipe 5 leading to the explosion chamber 37 (Figure 1) and 3 the outlet to the carburetter 14 from which the charge passes by pipe 21 to the tubular timing valve 38. A and B represent the engine cylinders that are separated by the partition wall $51^a$ provided with a plurality of perforations $51^b$, 49, 49' the upper pistons connected by their rods to the air pump piston, 32, 47, 47' the lower pistons connected by their rods to the crankshaft; 36, 36' the upper explosion chambers above the upper pistons and 37, 37' the lower explosion chambers between the upper and lower pistons.

48, 48' are the blast air inlet ports, 40, 42, 42' the exhaust ports and 39, 41, the inlet ports for admission of the charge to the cylinders through the tubular timing valve 38 hereinafter described.

On the faces of the cylinder pistons are cast deflector plates 50 for the effective displacement of the exhaust gases which plates cover and extend well beyond the air inlet ports 48; they are arranged very close to the cylinder walls and are grooved as shown at 50' in Figure 4 whereby in the case of the chambers 37 and 37' the scavenging air is first directed upwardly and downwardly against the wall and the two currents of air meet in the middle of the spaces between the pistons the exhaust gases passing out by the ports 42, 42'. The opposing deflectors 50 on the pistons may be somewhat out of alignment so that longer deflectors may be employed without making the compression space unduly large. Baffles 51 are arranged on the pistons to direct and diffuse the incoming charge to the centre of the chambers but these are set further from the cylinder wall, as shown in Figure 1, than those for deflecting the scavenging air.

The tubular timing valve 38 is arranged in the angle between the cylinders A and B the inlet ducts bifurcating into the latter, and acts as a sleeve valve, reciprocation being imparted to the valve by means of the valve rod 38ª operated by the cams on the crank, one cam being for a forward advance and the other cam for after reversal of the actions. The valve 38 has an inlet above which is in communication with the fuel inlet 21 from the carburetter 14 and three outlet ports lower down, 48'', 48', 48' adapted to register with the inlet ports 39, 41 and 41 in the cylinder wall the arrangement being such that ports 48''', 48', 48' uncover the ports 39, 41, 41, to admit the charge just as the scavenging air ports 48 and exhaust ports 42, 42', 40 are about to be closed.

The exhaust gases omitted through ports 40 pass by the pipe 25' to the carburetter jacket and from thence to the atmosphere by pipe 25'' but the pairs of exhaust ports 42, 42' are connected to a downtake 45 leading to the crank chamber 46. To simplify the drawings the exhaust piping is shown only at the right of Figure 2 but in practice such piping is arranged on both sides. The exhaust from chambers 36, 36' is at once discharged when their exhaust ports are uncovered by the pistons 49, 49' but that from chambers 37, 37' passes into the crank chamber 46, where its expansive force is utilized to aid the upward stroke of the lower pistons 47, 47'. When these pistons have ascended and are about to descend the valve or valves 44 discharge the exhaust gases from the crank case. These valves are preferably of the ordinary mushroom type, held in position by springs, and may be actuated by cam arrangement on crank shaft, being kept open for liberating from the crank case the spent gases of the previous stroke, which are liberated only during that period of the stroke when work is done by the expanding gases above the pistons 47, 47' during their descent. The valve 44 will close just as the ports 42, 42' are about to open to exhaust into the crank case for further work by expansion on the ascending pistons 47, 47' to assist in compressing the fresh fuel mixture between the four pistons 47, 47' and 49, 49'.

The air pump 32 is made of large capacity to supply the blast and carburetter air for the two pairs of explosion chambers. A cover 32' for the inlet of air is fixed on the pump, perforated with holes, 32'', and a disc 33' for preventing escape of captive air during the upstroke of the pump piston. The air pump piston 32''' works in cylinder 32 and has numerous apertures in its base, under which is attached a movable disc 33$^{iv}$ having similar holes but staggered in relation to those in the piston, so that on the ascent of the piston in the cylinder, a free passage of the captive air in the upper part of the cylinder is simply displaced below the piston by passing through the apertures. On the downward stroke the piston 32''' overtakes the disc 33$^{iv}$ and seals the apertures and so compresses the displaced air and forces the same through two spring-loaded mushroom valves 33 and 35, at the bottom of the pump chamber that open into distributing passages the left one communicating with downtakes 34 of sufficient capacity to hold and heat the scavenging air at a desired pressure and the right one 35 communicating with the carburetter 14. During the descent of air pump piston the suction created will, in addition to the pressure below, force the disc 33$^{iv}$ against the undersurface of piston 32''' and at the same time induct air for the next ensuing stroke through the open apertures 32'', in the pump cover 32' on which is the revolving disc 33' which has holes to match those in the cover 32'. On the return stroke of piston these holes are closed by the disc. The opening and closing of the apertures, is regulated by the up and down stroke of the engine oscillating a grooved spindle 62 which descends into the hollow formed in the upper part of the piston rod of the pump 32, see Figure 5. A boss is keyed to the top end of spindle 62, to which the pawl 60 is secured by a pin in the usual way and kept pressed by means of a spring against the notches of the ratchet wheels 61, which is fixed to the disc 33'. This disc revolves in one direction by successive steps, that is, one step at each up or down stroke of the pump piston 32''' by the action of the pawl 60, a subsidiary pawl, preventing the return of disc. A vertical groove in the spindle 62 has a set-off at its lower end in which a pin secured to the air pump rod works, an oscillating movement being imparted to the spindle 62 by this off-set at each terminal stroke of pump. A similar off-set at top end of groove gives another step advance to open a free passage of air to pump cylinder during the suction or down stroke. The air of the previous stroke having been displaced from above the air pump piston through the air passages in same, is forced through the check valves 33 and 35. These are grooves on opposite sides of spindle 62 for balancing purposes.

The air downtake 34 of the blast is provided with three air ports to chambers 36 and 37 one set of which—48—is shown in Figure 1. These ports are uncovered by the pistons 49, 49′ or 47, 47′ when about the end of their respective strokes and similarly and simultaneously the pairs of exhaust ports 40, 42, 42′ are opened by the pistons 49, 49′ and 47, 47′. The chambers 36, 36′ are therefore cleared of exhaust gases which are replaced by compressed pure air from ports 48. The exhaust ports 40 and scavenging ports 48 are therefore closed by the rising pistons, 49, 49′ but just prior to their closing, the inlet port 39 already uncovered by the piston is opened to 38 on the return stroke and closed by port 48″ owing to the rapid descent of the tubular valve 38, and is subsequently doubly closed by the rising pistons 49, 49′. In this way the rich mixture from the carburetter 14 mixes with the pure scavenging air in explosion chamber 36, so forming an explosive mixture which, as the pistons 49, 49′ further advance, is compressed and fired in the usual way.

A similar action goes on in the explosion chambers 37, 37′ except that the exhaust gases are forced through ports 42, 42 and 42′ by scavenging air into the crank case 46, wherein, of course, the pressure will rise somewhat owing to the pressure of the compressed and heated air in explosion chamber 37 or 37′. As before, however, the tubular timing valve 38 admits the rich mixture at 48′, 48′ just prior to the pistons 47, 49, 47′, 49′, on the inward stroke for compression covering the mixture inlets 41, 41, exhaust ports 42, 42′ and scavenging ports 48, the cylinders and ports 48′, 48′ of timing valve provide a clear way for the mixture and begin to be re-covered by the two lower and two upper pistons. The tubular valve 38 at that moment is rising, owing to the form of the cam or cams 38ᵇ on the crank shaft-disc which drives it, during which interval a free passage is offered for the rich gas to be forced from 38 into space 37.

There may be one cylinder only or a series of single cylinders each having two oppositely working pistons.

The cycle of operations will be obvious from that has been already described but may be briefly stated—assuming the cranks just off their dead centres and the pistons at the extreme ends of the cylinders, the exhaust and scavenging ports exposed and the air pump piston at the top of its stroke just about to descend.

By the descent of the air pump piston 32‴ air is drawn into the pump cylinder and the air trapped below the piston 32‴ from the previous stroke is as previously explained forced by the down-stroke of the piston through the valve 33 into the downtake 34 for scavenging and through valve 35 to the carburetter 14. The pistons 49, 49′, 47, 47′ on nearly reaching the limit of their outer strokes expose the exhaust, air and fuel inlets practically simultaneously but in the case of the inlet ports, although these are exposed by the pistons along with the exhaust and air inlets during a fractional part of the return stroke, they, i. e., the fuel inlets, are only free to admit fuel through the tubular timing valve 38, as previously explained, just prior to the covering of the pistons on their return stroke of the exhaust air and fuel inlets. As the rich fuel is admitted by means of the valve 38 into the cylinders charged with air, the fuel is diffused in same by means of the baffles 51 and during the inward travel of the pistons, the air and fuel becomes thoroughly mixed during the compression stage and on the completion of the inward strokes of the opposed pistons the mixture is fired by the sparking plug 63 in the usual manner, the resulting explosion forcing the pistons outwardly. Just as the pistons reach the limits of their outer strokes the three classes of ports, that is the exhaust, air fuel inlets are exposed, the exhaust for liberating the burnt gases, the air inlets for admitting air under pressure in the particular manner described by deflection by the plates 50 on the pistons so as to meet or collide in the centre of the working chambers and by this means charge the cylinder with air and at the same time drive out the burnt gases through the exhaust ports at each end of the working chamber of each cylinder.

A similar cycle of operations but differently timed is performed with regard to the upper pistons 49, 49′, as occurs between the pistons 47, 47′.

The burnt gases have half the distance to travel compared with other engines. Owing to the simple plain character of the cylinder being free from valves, pockets or excrescences, the temperatures of the cylinder walls are practically uniform resulting in a much higher average pressure from the exploded gas mixture and so economy of fuel. The opposed pistons give an equal torque on the crank shaft, the lower piston through its connecting rod imparts a compression thrust on the inner crank pin and at the same time the top piston through its cross-head (air pump piston) and side connecting rods in tension—pulls the outer crank pins. By the rapidity of clearing out the burnt gas by displacement with air mixed with fuel in correct proportion for the work required of the engine irrespective of the number of revolutions made by the engine per minute, the horse power will increase pro rata with the revolutions. Consequently, there is no normal efficiency speed as in other engines, for no matter how slowly or how fast it is run, it will automatically develop under all conditions and variations of load, one uniform power for each degree of unit of strength of fuel.

What I claim is:

An internal combustion engine comprising a plurality of cylinders, upper and lower oppositely moving pistons in each cylinder explosion chambers between each pair of upper and lower pistons and above the upper pistons, a crank shaft, an air pump mounted above the cylinders, a pump cylinder, a perforated piston operating in said pump cylinder and connected to the upper pistons and to the crank shaft, a movable perforated disc mounted below said piston, a perforated cover to said pump cylinder, a perforated disc rotatably mounted above said cover means for opening and closing the perforations in said cover by rotation of said last mentioned disc means connecting said lower pistons to the said crank shaft, a carburetter, means whereby air is forced by said pump to said carburetter and into said explosion chambers, tubular timing valve operatively connected to the crank shaft a series of fuel inlet ports in the walls of said cylinders a series of ports in said tubular timing valve coacting with said fuel inlet ports and a series of exhaust ports in said cylinder walls.

In testimony whereof I have affixed my signature hereto this 21st day of January, 1921.

LEWIS THOMAS GODFREY-EVANS.